US011956589B1

(12) United States Patent
Short, III et al.

(10) Patent No.: US 11,956,589 B1
(45) Date of Patent: Apr. 9, 2024

(54) PMD SPEAKER MOUNTING ASSEMBLY AND THERMAL CONTROL SYSTEM FOR MULTIPLE DRIVERS

(71) Applicant: Wisdom Audio Corp., Carson City, NV (US)

(72) Inventors: George E. Short, III, Oro Valley, AZ (US); Matthew C. Trinklein, Reno, NV (US); David J. Michno, Carson City, NV (US); Stuart Grindle Ringwald, Houston, TX (US)

(73) Assignee: WISDOM AUDIO CORP., Carson City, NV (US)

( * ) Notice: Subject to any disclaimer, the term of this patent is extended or adjusted under 35 U.S.C. 154(b) by 229 days.

(21) Appl. No.: 17/748,757

(22) Filed: May 19, 2022

Related U.S. Application Data

(60) Provisional application No. 63/221,278, filed on Jul. 13, 2021.

(51) Int. Cl.

| | |
|---|---|
| ***H04R 1/26*** | (2006.01) |
| ***H04R 1/02*** | (2006.01) |
| ***H04R 3/12*** | (2006.01) |
| ***H04R 7/04*** | (2006.01) |
| ***H04R 9/02*** | (2006.01) |
| ***H04R 9/06*** | (2006.01) |

(52) U.S. Cl.
CPC ............... *H04R 1/26* (2013.01); *H04R 1/025* (2013.01); *H04R 3/12* (2013.01); *H04R 7/04* (2013.01); *H04R 9/022* (2013.01); *H04R 9/025* (2013.01); *H04R 9/06* (2013.01)

(58) Field of Classification Search
CPC . H04R 1/26; H04R 1/025; H04R 3/12; H04R 7/04; H04R 9/022; H04R 9/025; H04R 9/06
See application file for complete search history.

(56) References Cited

U.S. PATENT DOCUMENTS

| | | |
|---|---|---|
| 2,821,260 A | 1/1958 | Shaffer |
| 3,013,905 A | 12/1961 | Gamzon |
| 3,164,686 A | 1/1965 | Tibbetts |
| 3,674,946 A | 7/1972 | Winey |

(Continued)

FOREIGN PATENT DOCUMENTS

| | | |
|---|---|---|
| GB | 2343912 B | 7/2002 |
| WO | 2008029083 A1 | 3/2008 |

*Primary Examiner* — Daniel R Sellers
(74) *Attorney, Agent, or Firm* — Polson Intellectual Property Law, PC; Margaret Polson; Christopher Sylvain

(57) ABSTRACT

A speaker assembly for good thermal management in loudspeakers such as planar magnetic drivers (PMDs). The assembly comprises a front panel with one or more sound openings, one or more PMDs each associated with a respective sound opening, one or more rear thermal plates each associated with a respective PMD structure plate, and a thermal spreader plate. The PMD structure plate is mounted to the front panel, the rear thermal plate is mounted to the associated PMD structure plate, and the thermal spreader plate is mounted to the one or more rear thermal plates, thereby forming a layered heatsink assembly. In a further development, the assembly has multiple PMDs and a circuit configured to modulate power handling and frequency response between the multiple PMDs.

23 Claims, 11 Drawing Sheets

(56) References Cited

U.S. PATENT DOCUMENTS

| | | | | |
|---|---|---|---|---|
| 4,468,530 | A * | 8/1984 | Torgeson | H04R 1/24<br>381/408 |
| 4,640,381 | A | 2/1987 | Tsuchiya | |
| 4,837,838 | A * | 6/1989 | Thigpen | H04R 9/047<br>181/173 |
| 4,860,369 | A | 8/1989 | Koshimura | |
| 5,081,683 | A * | 1/1992 | Torgeson | H04R 1/26<br>381/186 |
| 5,331,119 | A | 7/1994 | Leger | |
| 5,400,412 | A | 3/1995 | King, Sr. | |
| 6,944,310 | B2 | 9/2005 | Ito | |
| 7,099,488 | B2 | 8/2006 | Bohnlender | |
| 7,903,834 | B1 * | 3/2011 | Graber | H04R 1/403<br>381/334 |
| 8,009,857 | B2 | 8/2011 | Bohnlender | |
| 9,258,638 | B2 | 2/2016 | Colich | |
| 9,674,615 | B2 | 6/2017 | Fan | |
| 11,272,275 | B1 | 3/2022 | Michno | |
| 2002/0118856 | A1 * | 8/2002 | Croft, III | H04R 9/06<br>381/431 |
| 2004/0026585 | A1 * | 2/2004 | Hutt | H04R 31/006<br>248/309.1 |
| 2004/0047488 | A1 * | 3/2004 | Levitsky | H04R 9/048<br>381/399 |
| 2005/0045415 | A1 | 3/2005 | Popken | |
| 2005/0147270 | A1 | 7/2005 | Hecht | |
| 2005/0263341 | A1 | 12/2005 | Minneci, Jr. | |
| 2007/0039777 | A1 | 2/2007 | Whitaker | |
| 2007/0263894 | A1 * | 11/2007 | Stiles | H04R 3/12<br>381/335 |
| 2009/0097693 | A1 | 4/2009 | Croft, III | |
| 2012/0263338 | A1 * | 10/2012 | Hori | H04R 3/02<br>381/398 |
| 2013/0156252 | A1 | 6/2013 | Wang | |
| 2015/0271583 | A1 | 9/2015 | Wan | |
| 2015/0326974 | A1 | 11/2015 | Skubinski, III | |
| 2021/0410332 | A1 * | 12/2021 | Rahim | H05K 7/205 |

* cited by examiner

PMD SPEAKER MOUNTING ASSEMBLY AND THERMAL CONTROL SYSTEM FOR MULTIPLE DRIVERS

BACKGROUND

Planar magnetic driver (PMD) designs have been used for loudspeaker transducers. In double-sided magnet configurations, a flat diaphragm is positioned between front and rear magnets. The front and rear magnets may be single magnets or an array of magnets depending on the particular design. Rare-earth magnets, such as neodymium magnets, are generally preferable since they produce a strong magnetic field. The diaphragm is typically a flexible substrate film (e.g. BoPet, PEEK, polyimide) carrying an electrical conductor trace. Electrical audio signals through the planar diaphragm generate variable magnetic fields which react to the magnetic field provided by the permanent magnets, causing the diaphragm to vibrate and therefore generate sound. The diaphragm and magnets are arranged into their desired relative positions by one or more mounting structures.

Smaller drivers are needed for high frequencies, commonly referred to as tweeters. However, due to their relatively small size, such drivers are limited as to their power handling capacity. Thermal failure problems can arise due to excess heat buildup with increasing the PMD tweeter output. For example, the conductor traces on the diaphragm can become hot enough to begin to delaminate from the substrate film. In addition, the magnets themselves can become hot enough to begin to demagnetize. This has been observed to start occurring around 186° F. (about 85° C.) for neodymium magnets and continues until the magnets are fully demagnetized.

In loudspeakers, drivers are generally mounted to panel structures, which in turn are mounted in their desired position in a device housing or wall. For example, an individual PMD or multiple PMDs may be provided with a front panel, which provides an exterior-facing component or cover piece of the loudspeaker unit, typically in conjunction with a hard or soft speaker grille. For example, the front panel may be part of or incorporated into a standalone product housing. For in-wall or in-ceiling speaker applications, the front panel may be mounted into or onto the environment surface, or otherwise part of an installation assembly for such a surface. Or the front panel may be part of or incorporated into the housing or paneling for a larger speaker array, including standalone or in-surface arrays. It has been cost-effective to produce such front panels from plastic via injection molding.

Using multiple PMDs or incorporating same into a larger speaker array can improve sound quality by covering a greater range of frequencies and create various options in sound design as to dispersion, interference, and focusing effects. One possible configuration includes three PMDs arranged as a midrange-tweeter-midrange (MTM) loudspeaker. The center PMD or tweeter is responsible for high frequencies. The MTM loudspeaker may be provided as a single unit or incorporated into a larger speaker array.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and depicted in conjunction with systems, tool and methods which are meant to be illustrative, not limiting in scope. In various embodiments, one or more problems above have been reduced or eliminated, while other embodiments are directed to other improvements.

Proceeding from this background, the present disclosure is directed to improving thermal management in loudspeakers, in particular high-frequency PMDs, such that the above problems associated with demagnetization and delamination are reduced or eliminated. Another aspect is to increase and maintain power handling of such PMDs and therefore the maximum sound pressure level (SPL) output, without sacrificing frequency response.

In one respect, a speaker mounting assembly is provided which comprises a front panel, one or more PMD structure plates, one or more rear thermal plates each associated with a PMD structure plate, and a peripheral thermal spreader plate. The front panel provides the outward-facing component of the assembly and acts as large heatsink. The PMD structure plate provides a mounting platform for arranging the driver components, in particular the diaphragm and one or more rear magnets, into their desired positioning. One or more front magnets may be supported by the front panel adjacent the diaphragm opposite the one or more rear magnets supported on the PMD structure plates. Each PMD structure plate is attached to the front panel on one side, and an associated rear thermal plate on the other side. The rear thermal plates are in turn attached to the thermal spreader plate. Since the drivers are individually constructed, the PMD structure plates, rear thermal plates and large thermal spreader plate are preferably separate components. This can provide benefits with respect to simplified manufacturing, ease of assembly, and component modularity for different design configurations. For example, the same rear thermal plates can be used with a spreader plate designed to accommodate more or fewer PMDs. In addition, the separate structure plates and rear thermal plates for each PMD helps prevent shunting heat directly from one PMD to another. The assembly forms a layered heatsink sandwich which effectively transfers heat away from the diaphragm and magnets of the PMD.

In a further respect, a loudspeaker system with multiple PMDs is provided comprising such a speaker mounting assembly, as well as a circuit which modulates power handling and frequency response between the multiple PMDs. In one embodiment, the system is designed as a midrange-tweeter-midrange (MTM) with three PMDs, wherein the center driver handles power requirements and output for high frequencies. The drivers themselves may be otherwise identical in design. The circuit is configured to allow high frequency signals to bypass the outer midrange drivers and only play through the center driver. Quite surprisingly and unexpectedly, this system was found to increase power handling by at least a factor of 2, while reducing driver temperatures by up to 100° F. or more, thus increasing sound output without thermal damage due to demagnetization or delamination. Accordingly, the design provides a midrange array with a power tapered point source tweeter, which can be matched with larger and thus higher power handling assemblies, without sacrificing system output. In other words, it is possible to build a system with a small midrange/tweeter array that can handle enough power to match with much larger driver/woofers, such as those used in line arrays. Such output capability had previously been provided by using multiple tweeter drivers, which can result in dispersion and frequency response problems (e.g. comb filtering, off-axis cancellations, and non-linear frequency response changes from near field to far field), or using larger single drivers, which generally results in a tradeoff in frequency response at high frequencies. In comparison, the disclosed system can be used to increase tweeter section power handling and maximum sound pressure level, without sacrificing tweeter dispersion or frequency response.

A speaker mounting assembly comprises a front panel, at least one PMD, at least one rear thermal plate, and a thermal spreader plate. The front panel has a front side, a rear side, and at least one sound opening extending therebetween, with one or more support members extending across the opening. The rear side has an interface surface adjacent the opening. The PMD is associated with the opening. The PMD comprises at least one front magnet, one or more rear magnets, a diaphragm arranged between the rear and front magnets, and a PMD structure plate having a magnet mounting surface and lateral mounting flanges. The magnet mounting surface and mounting flanges have a first side that faces in a direction of the front panel and a second side that faces away from the front panel. The one or more rear magnets are arranged on the first side of the magnet mounting surface. The diaphragm extends between the mounting flanges, with the mounting flanges positioned at a distance from the magnet mounting surface to accommodate the one or more rear magnets between the diaphragm and the first side of the magnet mounting surface. The rear thermal plate is associated with the PMD structure plate. The rear thermal plate comprises lateral mounting flanges attached to a frame, wherein the frame and mounting flanges have a first side that faces in the direction of the front panel and a second side that faces away from the front panel. The thermal spreader plate is designed as a frame forming an opening, with a first side that faces in the direction of the front panel and a second side that faces away from the front panel, and relief surfaces formed on the first side adjacent the opening of the thermal spreader plate.

In this assembly, the PMD structure plate is mounted to the front panel, the rear thermal plate is mounted to the PMD structure plate, and the thermal spreader plate is mounted to the rear thermal plate. The interface surface of the rear side of the front panel interfaces with the first sides of the mounting flanges of the PMD structure plate. The second side of the magnet mounting surface of the PMD structure plate interfaces with the first side of the frame of the rear thermal plate, and the second sides of the mounting flanges of the PMD structure plate interface with the first side of the mounting flanges of the rear thermal plates. The second sides of the mounting flanges of the rear thermal plate interface with the relief surfaces formed on the first side of the frame of the thermal spreader plate. Tolerance gaps preferably remain between the front panel and the thermal spreader plate. The front panel, the PMD structure plate, the rear thermal plate, and the thermal spreader plate may be coupled via fasteners inserted into fastener holes which extend through the thermal spreader plate, the flanges of the rear thermal plate and the flanges of the PMD structure plate, and extend into the front panel where the fasteners are anchored.

The front and rear magnets may be neodymium bar magnets for example. The at least one front magnet of the PMD may be mounted to the support member of the front panel on the rear side thereof, such as with adhesive. For example, the support member may be a solid crossmember with a magnet mounting recess into which the front magnet is positioned. Additional mesh structures or frame members may be provided in the opening on either side of the support member. In another example, the support member is provided as a mesh structure. The front magnet may be mounted to this mesh structure, such as with adhesive. The one or more rear magnets may be aligned with their ends positioned in retainers, and attached to the retainers and/or the magnet mounting surface of the PMD structure plate with adhesive. The magnet mounting surface preferably has a plurality of apertures or slots extending therethrough for heat transfer and circulation. The frame of the rear thermal plate preferably has at least one crossmember extending across an opening formed by peripheral members of the frame. Such crossmember interfaces with the second side of the magnet mounting surface.

In one embodiment, the speaker mounting assembly has three PMDs, the front panel has three sound openings, and one of the three sound openings is a central sound opening positioned between two outer sound openings. Thus, the PMD associated with the central sound opening is a center PMD, and the PMDs associated with the outer sound openings are outer PMDs. The assembly may further have a circuit comprising a first path and a second path connected in parallel to the first path. The first path includes a capacitor and a resistor which are connected in parallel to one another and connected in series to the center PMD. The second path includes an inductor connected in series to one or both of the outer PMDs. If the second path includes only one of the outer PMDs, the circuit further comprises a third path connected in parallel to the first and second paths, wherein the third path includes an inductor connected in series to the other outer PMD. The three PMDs may be identical or different in design. For example, all three PMDs may have a frequency range of at least 500-20000 Hz. The outer PMDs preferably have a higher signal resistance than the center PMD at tweeter frequencies above 2000 Hz, with the center PMD being solely or primarily responsible for sound production at these tweeter frequencies. All three PMDs may produce sound at midrange frequencies between 500-2000 Hz, with the center PMD handling less power than the outer PMDs at these midrange frequencies.

The preceding discussion is provided to introduce a selection of concepts in a simplified form that are further described below. The preceding discussion is not intended to identify key or essential features of the claimed subject matter, nor is it intended to be used to limit the scope of the claimed subject matter. Other features, details, utilities, and advantages will be apparent from the below descriptions of various implementations as further illustrated in the accompanying drawings, wherein like reference characters designate corresponding parts in the several views.

BRIEF DESCRIPTION OF THE DRAWINGS

The present disclosure is described hereinafter based on illustrative embodiments with reference to the accompanying figures, wherein.

Figure 1:
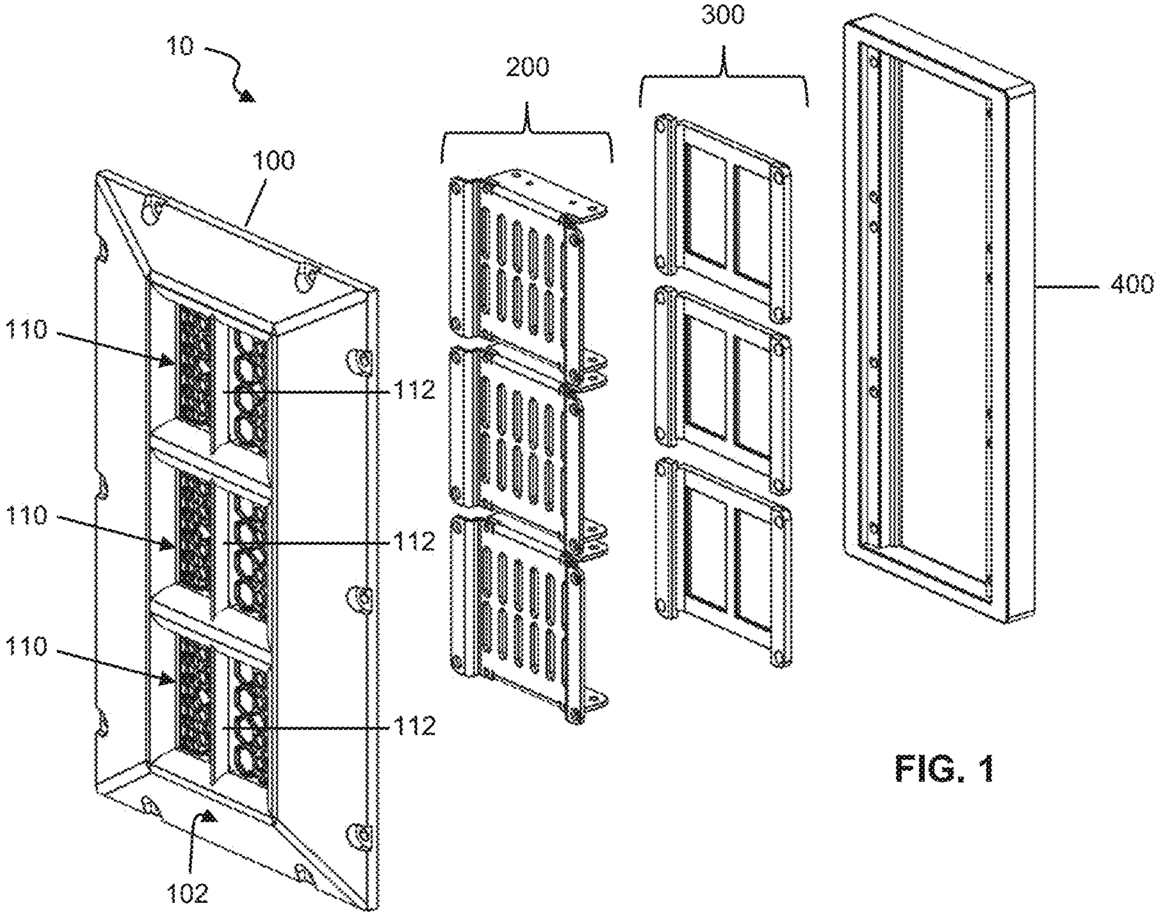
FIG. 1 shows a front perspective view in explosion of the components of a PMD mounting assembly, including a front panel, PMD structure plates, rear thermal plates, and a peripheral thermal spreader.
Figure 2:
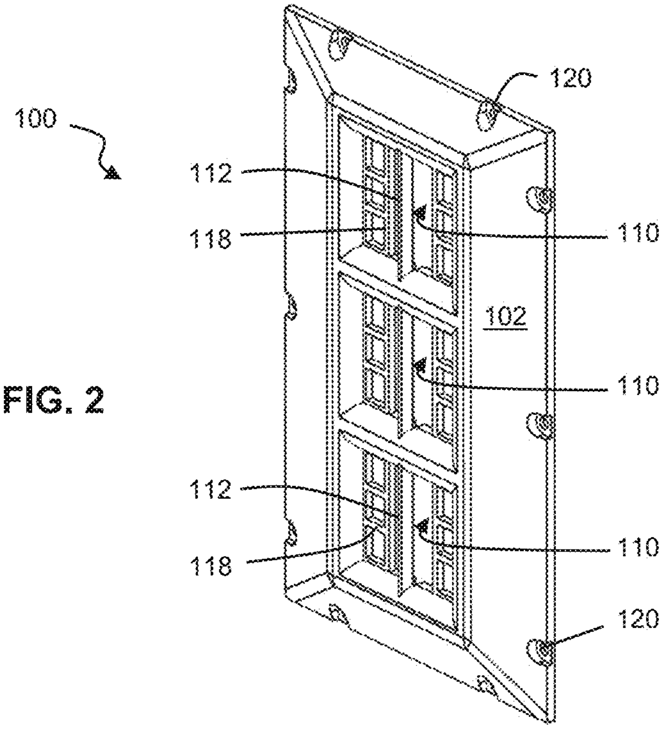
FIG. 2 shows a front perspective view of another embodiment of the front panel.
Figure 3:
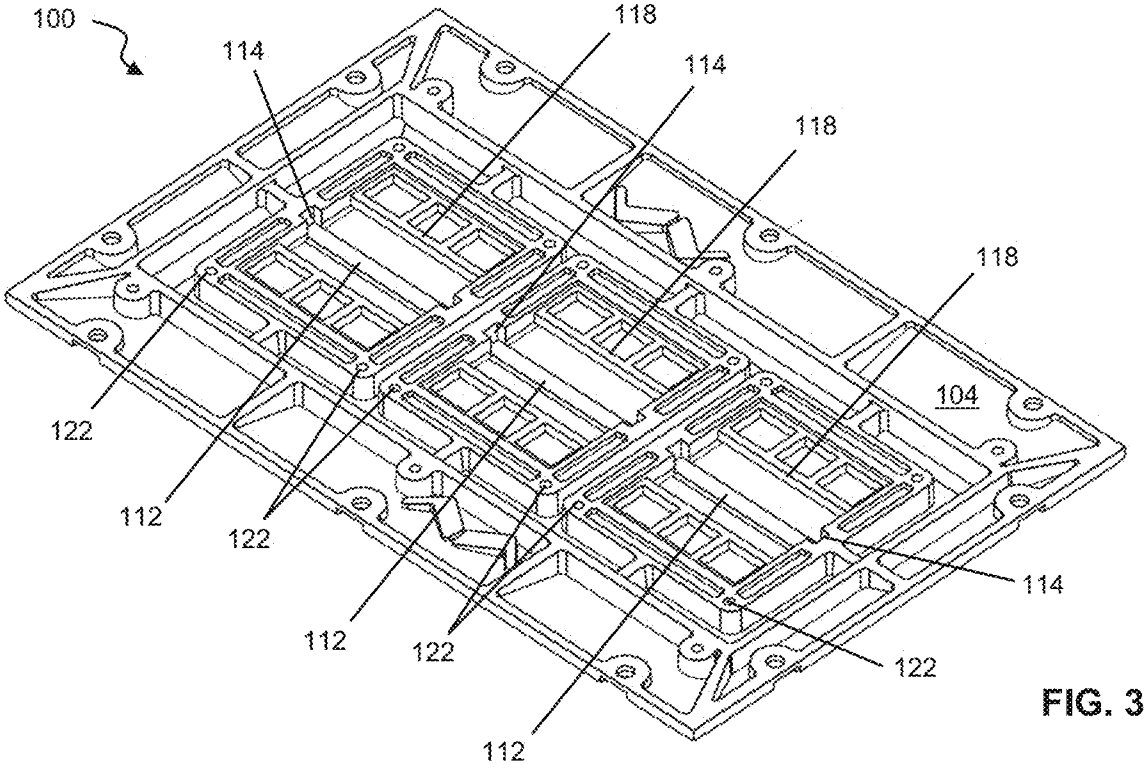
FIG. 3 shows a rear perspective view of the front panel of FIG. 2.
Figure 4:
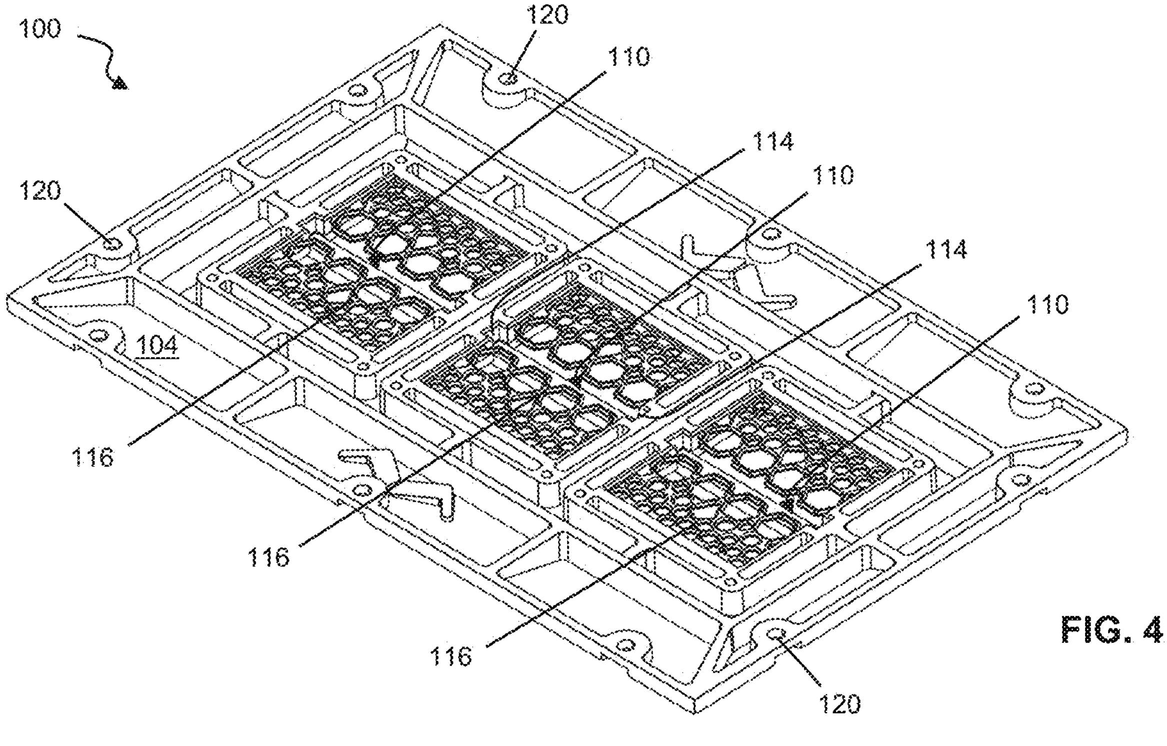
FIG. 4 shows a rear perspective view of the front panel of FIG. 1.
Figure 5:
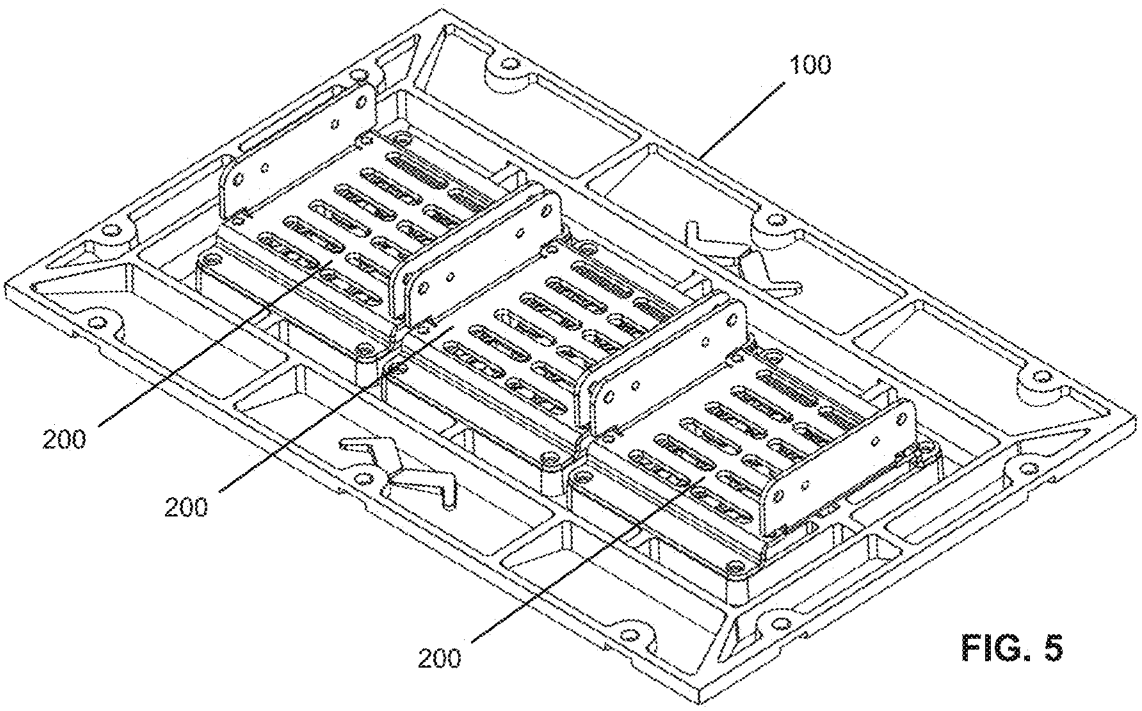
FIG. 5 shows the front panel of FIG. 4 with PMD structure plates assembled.
Figure 6:
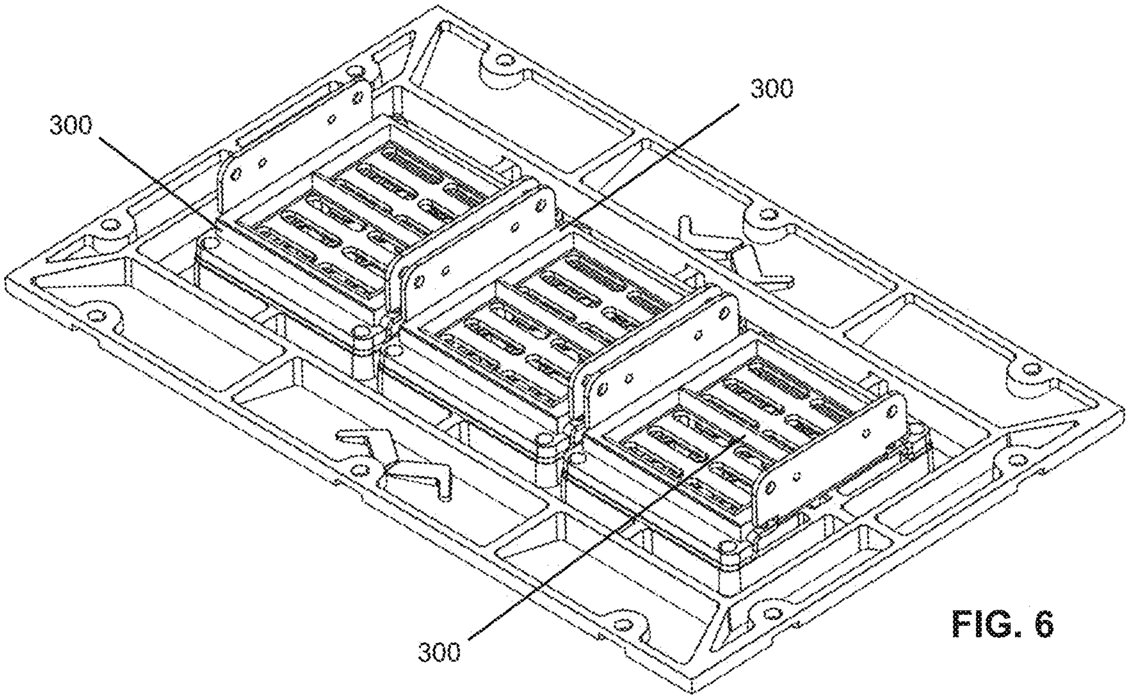
FIG. 6 shows the arrangement of FIG. 5 with rear thermal plates assembled.
Figure 7:
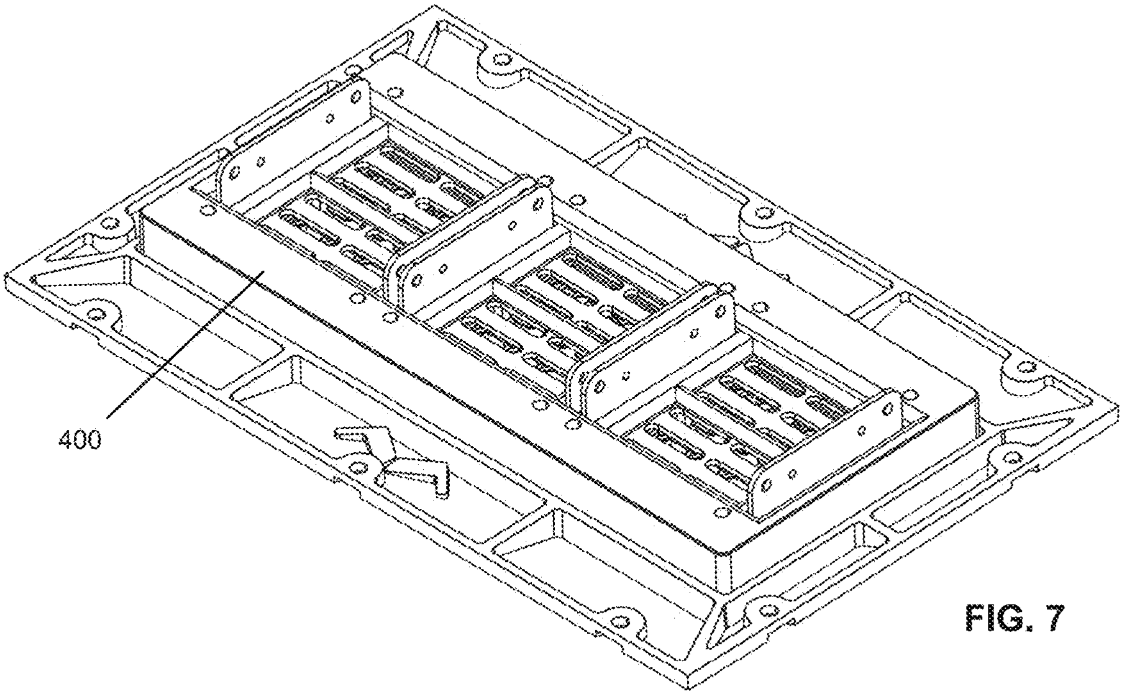
FIG. 7 shows the arrangement of FIG. 6 with the thermal spreader assembled.
Figure 8:
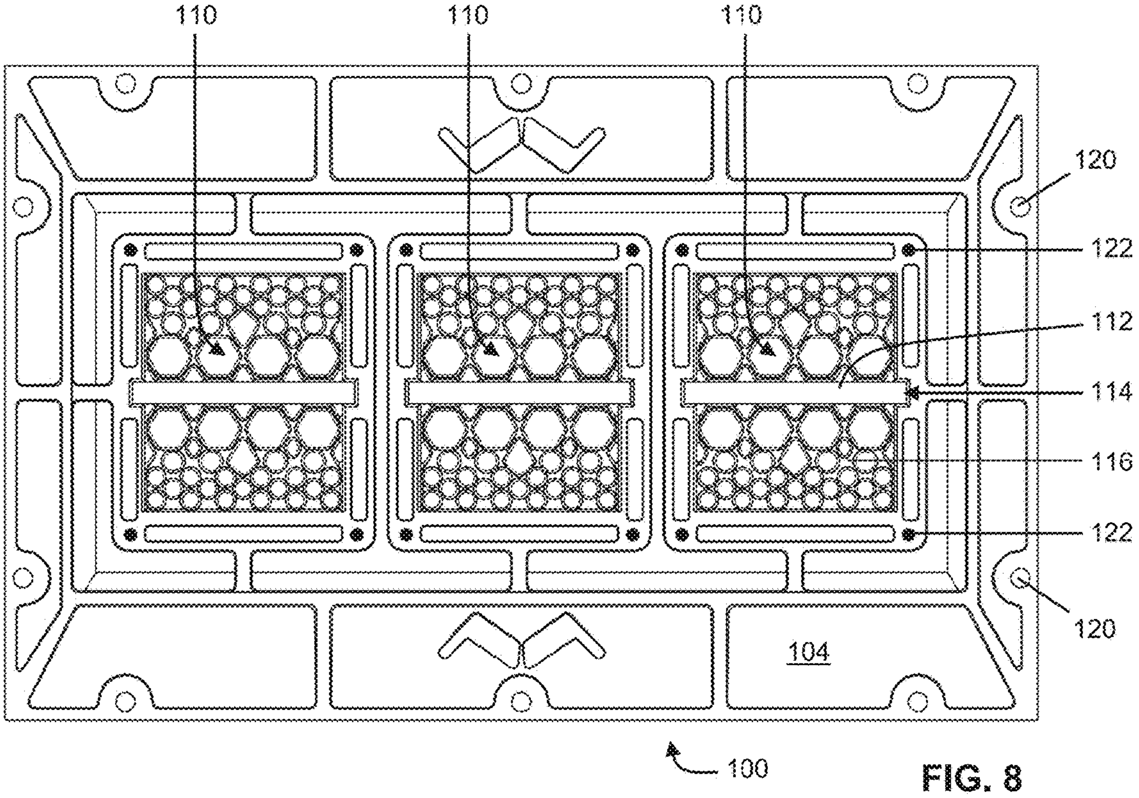
FIG. 8 shows a rear side view of FIG. 4.
Figure 9:
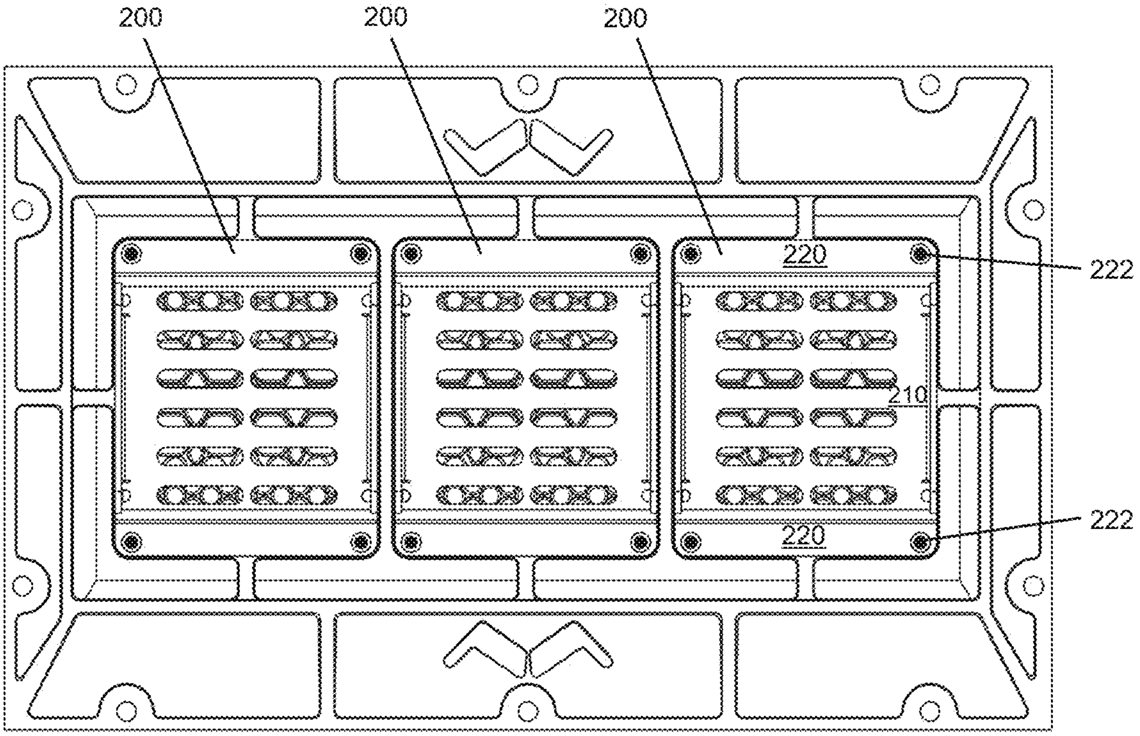
FIG. 9 shows a rear side view of FIG. 5.
Figure 10:
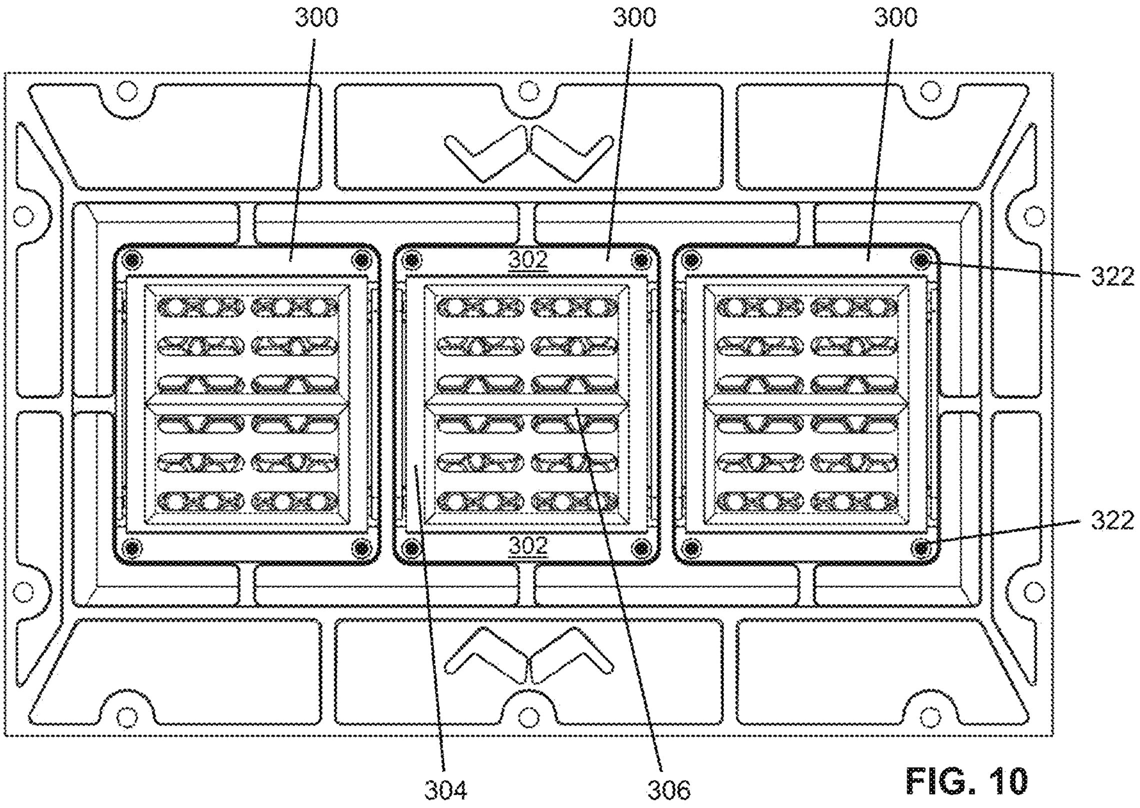
FIG. 10 shows a rear side view of FIG. 6.
Figure 11:
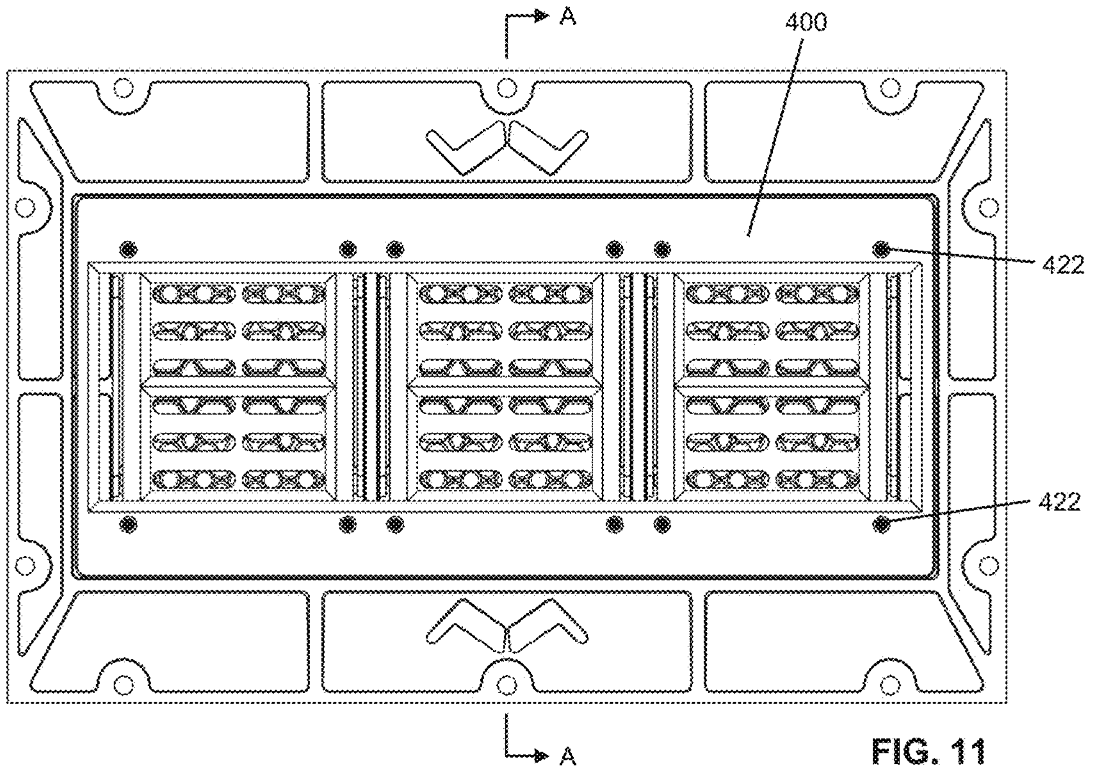
FIG. 11 shows a rear side view of FIG. 7.

Before explaining the depicted embodiments, it is to be understood that the invention is not limited in its application to the details of the particular arrangements shown, since the invention is capable of other embodiments. It is intended that the embodiments and FIGS. disclosed herein are to be considered illustrative rather than limiting. Also, the terminology used herein is for the purposes of description and not limitation.

DETAILED DESCRIPTION

Certain terminology is used in the following description for the purposes of clear and concise explanation, which should not be considered or construed as limiting. For example, terms such as “connected” or “attached” include both directly and indirectly connected or attached, respectively, unless indicated otherwise. This applies not only to these specific terms, but also to similar, related, and derivative terms and phrases as well.

With reference to FIGS. 1-18, a PMD mounting assembly 10 comprises a front panel 100, three PMD structure plates 200, three rear thermal plates 300, and a peripheral thermal spreader plate 400. This particular embodiment is designed for three PMDs. Of course, the assembly 10 may instead be designed for fewer or more than three PMDs.

The front panel 100 provides the outward-facing component of the assembly 10. The front panel 100 is made of a heat conductive material, such as aluminum, and therefore also serves as a large heat sink. The front panel 100 has a front side 102 which would face outward such as into an exterior environment (see FIGS. 1-2), and a back side 104 which would face inward such as into a device housing or wall (see FIGS. 3-4 and 8). The back side 104 includes cavities and ribs which reduce material requirements, as well as radiate heat in the manner of heat exchanger fins at least to some extent. This embodiment has a set of three sound openings 110 for each of the three PMDs. A front magnet support member 112 extends across each opening 110. On the back side 104, the front magnet support member 112 include recesses 114, into which front magnets of the PMDs are mounted. This embodiment is designed for a PMD using a single front bar magnet. Of course, the number, position, and shape of the members 112 and recesses 114 for each PMD may be readily modified for PMD designs with a different front magnet configuration. For example, additional support members 112 may be provided where the PMD has an array of front bar magnets. The front magnets of the PMDs are typically mounted to the front panel 100. For example, the front magnets may be directly attached to the rear surfaces of the support members 112 with adhesive. The adhesive may be provided along the entire interface between the magnet surfaces and the front panel surfaces. Alternatively, the adhesive may be provided only in one or more portions of the interface such that, in other portions, the magnet surfaces abut the front panel surfaces without adhesive therebetween. The mounting arrangement of the front magnets on the front panel 100 provides good thermal communication between the front magnets and the front panel 100, which transfers heat from the front magnets and dissipates same throughout its structure. In FIG. 1, the front panel 100 comprises an optional heat-wicking mesh structure 116 in each of the openings 110. The mesh structure 116 draws heat dissipated by the PMD from the air. The embodiment of FIG. 2 does not include the same heat-wicking mesh structures 116. Rather, additional frame members 118 are provided in the opening 110 on either side of the support members 112. The frame members 118 also wick heat from the PMDs. Due to their simpler design, the members 118 are generally easier and cheaper to manufacture compared to the higher heat-wicking mesh structures 116. Both structures 116 and members 118 may support an acoustic felt or fabric covering. Either structures 116 and members 118 may be used, alone or in combination, or neither may be provided in the opening 110, in view of the cost and thermal design requirements. Rather than as solid crossmembers, the front magnet support members 112 may also be provided as mesh structures 116 with a mesh structure design configured to support the front magnets of the PMDs. The front panel 100 may further comprise bosses with fastener holes 120 for coupling the front panel 100 to another structure, e.g. a device housing, paneling or a wall surface. The back side 104 of the front panel 100 has fastener holes 122 formed in interface surfaces for receiving and mating fasteners to attach the other components 200, 300, 400 of the assembly 10. The PMD structure plates 200 are mounted to the front panel 100 (see FIGS. 5 and 9).

Figure 15:
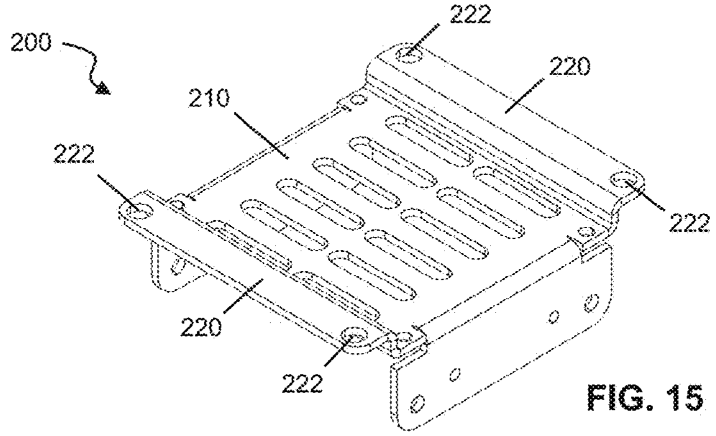
FIG. 15 shows a perspective view of the PMD structure plate in isolation.

The PMD plate 200 provides a structural component of the speaker driver for mounting the rear magnets and the diaphragm (see FIG. 15). The PMD structure plate 200 is typically made of steel, though other materials may also be used. The PMD structure plate 200 comprises a flat magnet mounting surface 210 and lateral mounting flanges 220. One or more rear magnets of the PMD will be arranged on the surface 210 for driving the diaphragm. The surface 210 includes a plurality of apertures, in the form of slits in this example, which help with air circulation and heat dissipation. The mounting flanges 220 are positioned at a distance from the surface 210 to accommodate the introduction of the magnets. The diaphragm of the PMD will be connected to the mounting flanges 220 and tensioned between the at least one front magnet supported by the front panel 100 and the rear magnets supported on the surface 210. The mounting flanges 220 include fastener holes 222 which align with the fastener holes 122 of the front panel 100. The front sides of the mounting flanges 220 interface with the front panel 100. The back sides of the surface 210 and mounting flanges 220 interface with a rear thermal plate 300 (see FIGS. 6 and 10).

Figure 16:
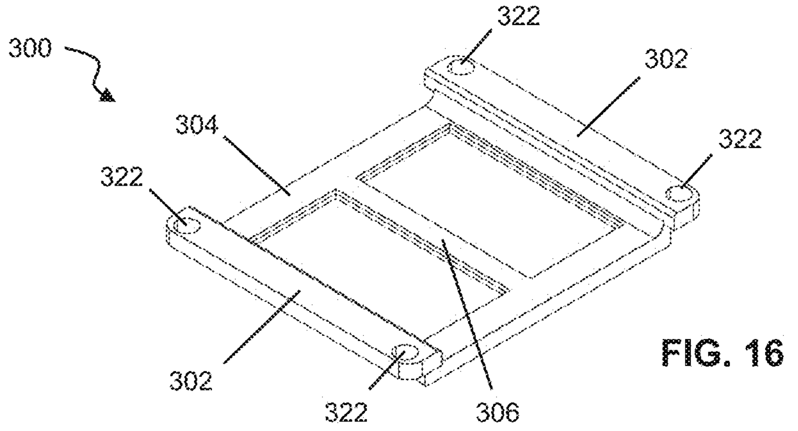
FIG. 16 shows a perspective view of the rear thermal plate in isolation.

A rear thermal plate 300 is associated with each PMD structure plate 200 (see FIG. 16). The rear thermal plate 300 contacts its PMD structure plate 200 to draw heat therefrom. The rear thermal plates 300 are made of a heat conductive material, such as aluminum. Like the PMD structure plate 200, the rear thermal plate 300 comprises two mounting flanges 302, which interface with the flanges 220 opposite the front panel 100. The mounting flanges 302 include fastener holes 322 which align with the fastener holes 222 of the PMD structure plate 200. The mounting flanges 302 are attached to a frame 304 with at least one crossmember 306 which extends across the opening formed by the frame body 304. The frame body 304 and member 306 interface with the magnet mounting surface 210 opposite the rear magnets of the PMD. The crossmember 306 contacts the center of the surface 210 to draw heat from the middle of the surface 210 and thus also the central rear magnets. The thermal plates 300 are in turn coupled to the thermal spreader plate 400 (see FIGS. 7 and 11).

Figure 17:
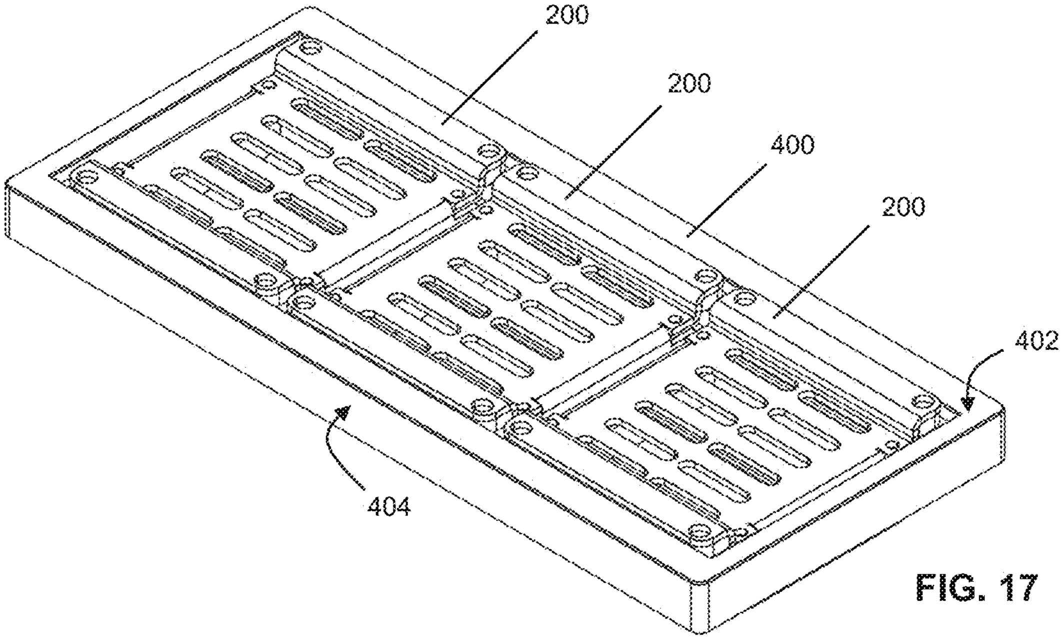
FIG. 17 shows a front perspective view of the thermal spreader, rear thermal plates, and PMD structure plates assembled.
Figure 18:
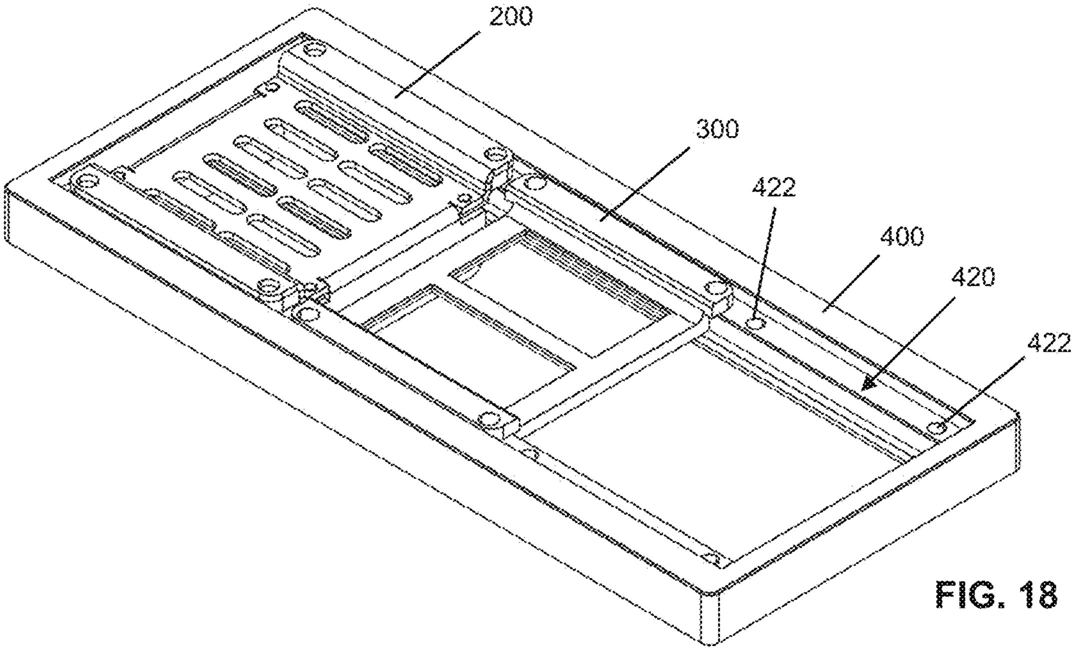
FIG. 18 shows the arrangement of FIG. 17 with the PMD structure plate omitted in one position, and both the PMD structure plate and the rear thermal plate omitted in another position.

The thermal spreader plate 400 is designed as a rectangular frame, with relief surfaces 420 formed on the inner side of the frame for mounting the rear thermal plates 300 (see FIGS. 17-18). The relief surfaces 420 include fastener holes 422 which align with the fastener holes 322 of the rear thermal plates 300. The front side 402 of the plate 400 contacts the thermal plates 300, and thereby transfers heat therefrom and distributes the heat outward through its structure. The front side 402 and lateral side 404 of spreader plate 400 are in close proximity to the front panel 100, such that heat transfer via radiation is possible between the panel 100 and plate 400 or vice versa, but also such that tolerance gaps 410 remain for air circulation and thus heat transfer via fluid convection (see FIG. 12).

Figure 12:
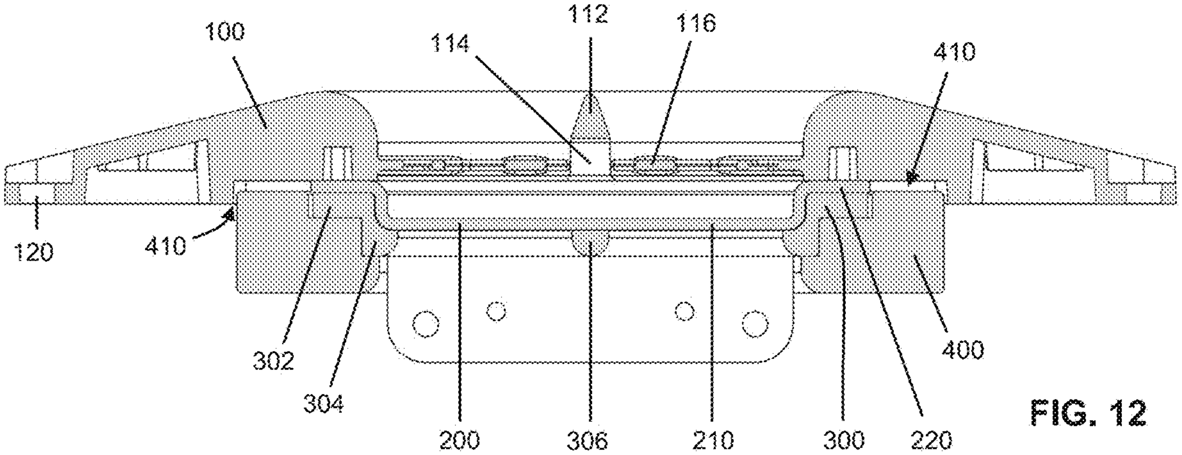
FIG. 12 shows a sectional view taken along line A-A of FIG. 11.
Figure 13:
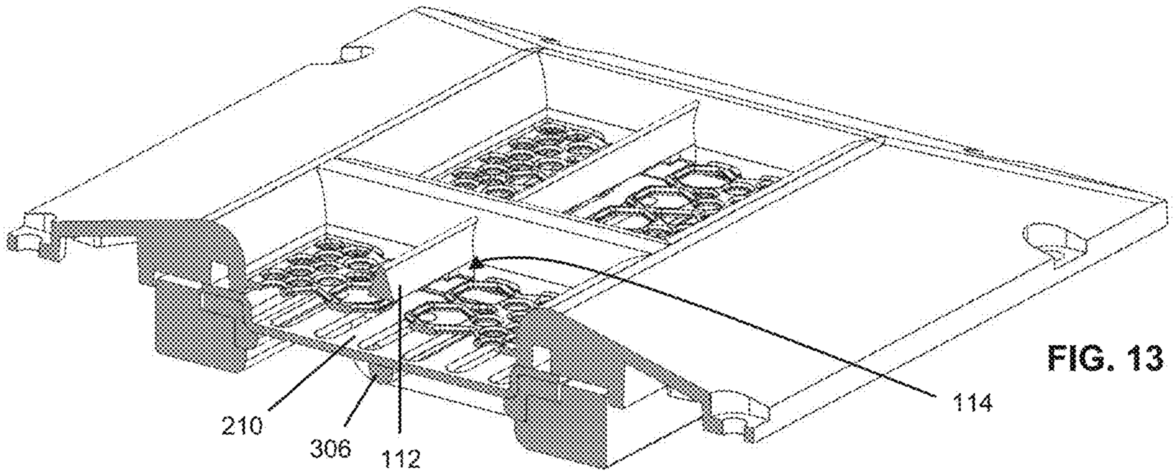
FIG. 13 shows the sectional view of FIG. 12 in perspective.
Figure 14:
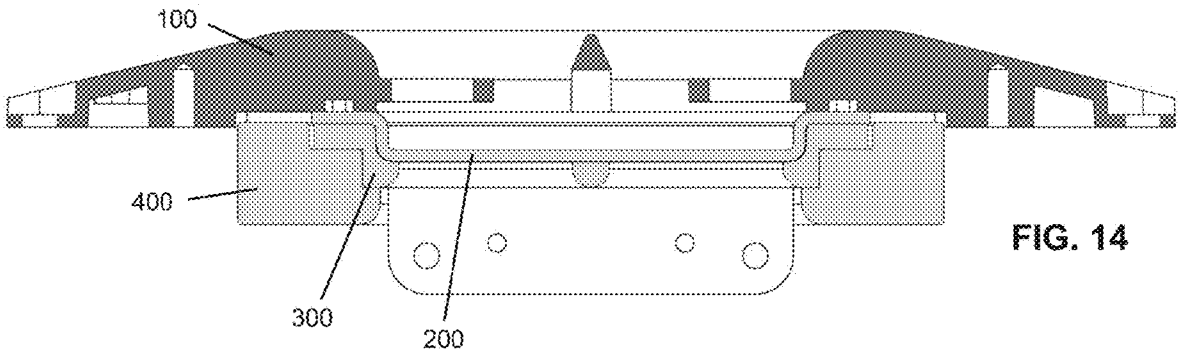
FIG. 14 shows the sectional view of FIG. 12 with the front panel of FIG. 2.

When the assembly 10 is assembled, fasteners (not shown) are inserted through the aligned fastener holes 422, 322, 222 and mated into fastener holes 122 to couple the front panel 100, PMD structure plates 200, rear thermal plates 300, and peripheral thermal spreader plate 400 together. The sectional views of FIGS. 12-14 show the layered arrangement of the assembly 10.

Figure 19:
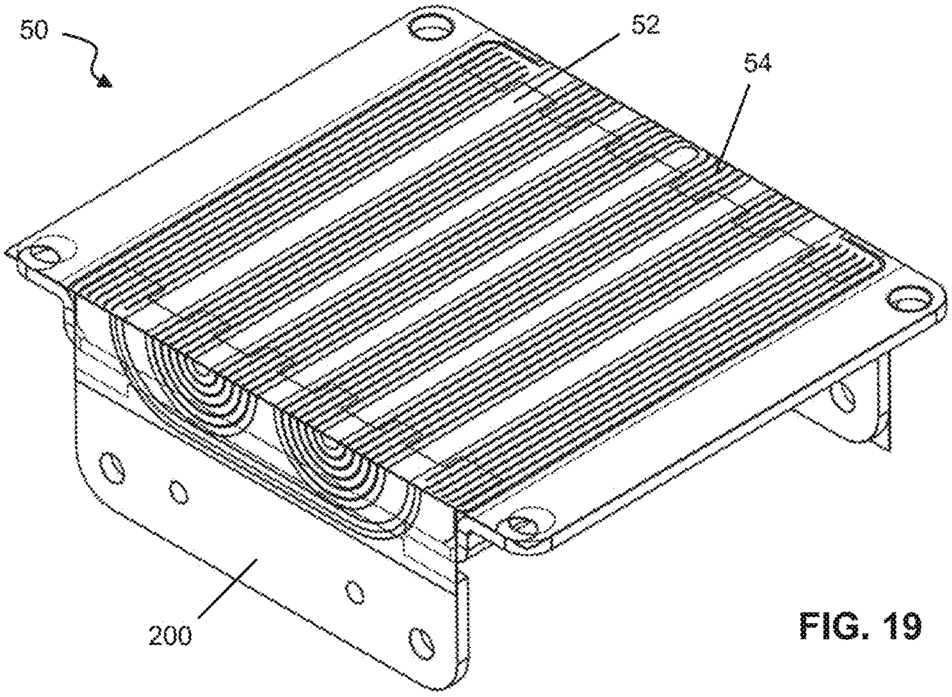
FIG. 19 shows a perspective view of an example PMD configuration including the PMD structure plate.
Figure 20:
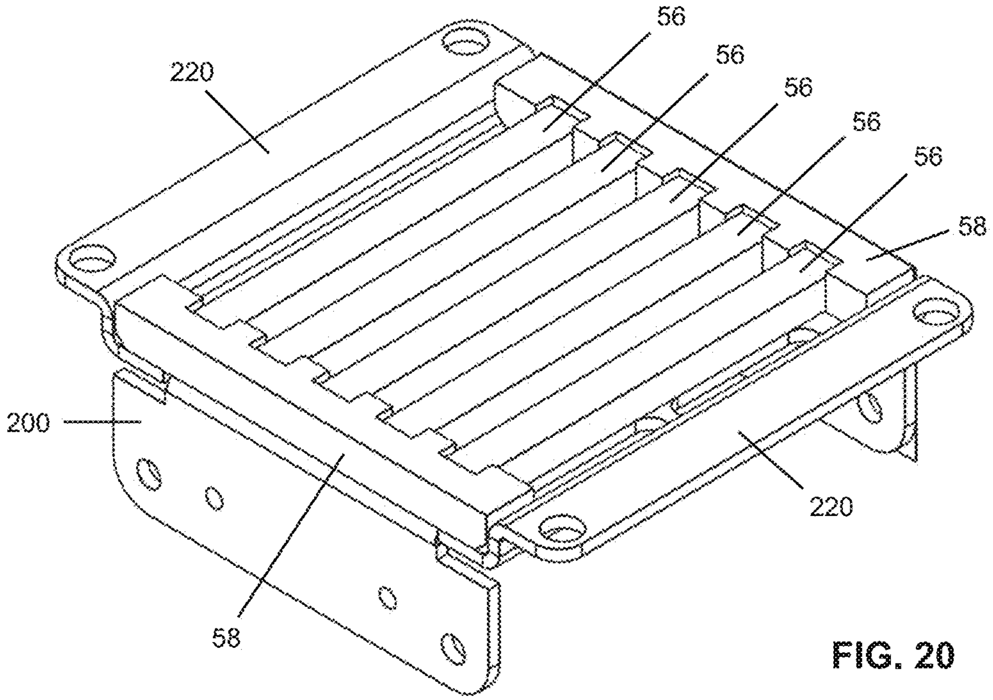
FIG. 20 shows the PMD configuration of FIG. 19 with the diaphragm omitted.

FIGS. 19 and 20 show an example configuration for a PMD 50 with the structure plate 200. The diaphragm 52 of the PMD 50 is provided with a conductive trace 54 and extends over magnets 56 between the mounting flanges 220 of the structure plate 200. These magnets 56 are the rear magnets of the PMD 50. The rear magnets 56 are arranged on the surface 210 of the plate 200 beneath the diaphragm 52 and aligned with their ends positioned in retainers 58. The rear magnets 56 may be attached to the surface 210 and/or the retainers 58 with adhesive, such as a perchloroethylene adhesive for example. One or more front magnets (not shown here) of the PMD 50, which may be carried by the front panel 100 as described above, are arranged above the diaphragm 52 opposite the rear magnets 56 in the view of FIG. 19. Electrical audio signals fed to the trace pattern 54 generate variable magnetic fields which interact with the permanent magnets, causing the diaphragm 52 to vibrate and produce sound.

Figure 21:
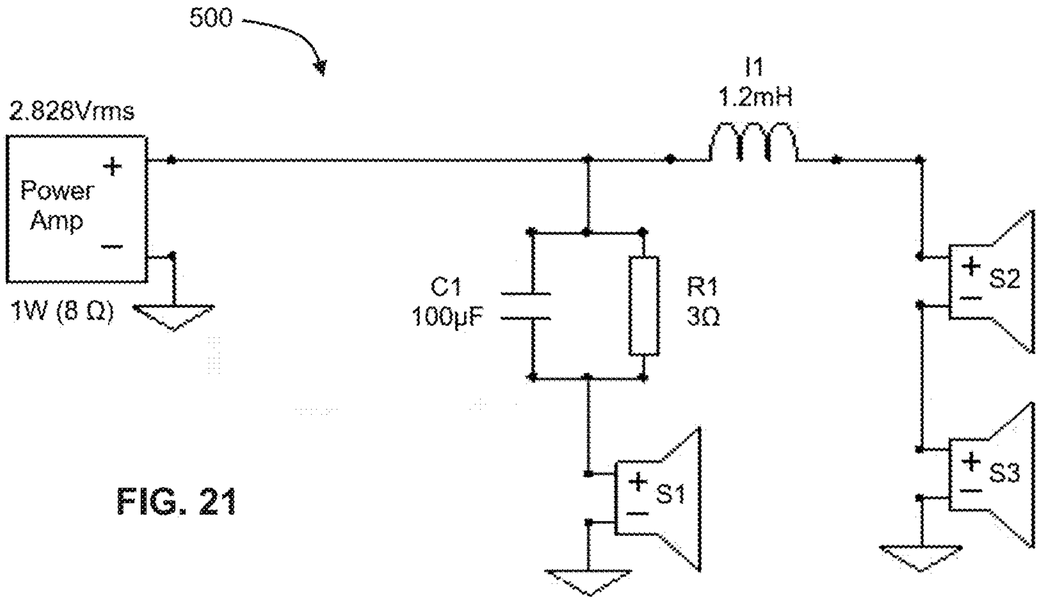
FIG. 21 shows an electrical diagram for a three PMD array to control power tapering and frequency response tailoring.

A loudspeaker system with multiple PMDs comprises a mounting assembly 10 such as previously described, as well as a circuit which modulates frequency between the multiple PMDs. An example circuit 500 is shown in FIG. 21 which provides a passive contour network. In this embodiment, the loudspeaker is a midrange-tweeter-midrange (MTM) with three PMDs S1, S2, S3. The MTM frequency range is about 500 Hz-20 kHz. The PMDs themselves may be identical in structural design, as is the case with PMDs S1, S2, S3. The center driver S1 (the tweeter) is responsible for higher frequencies than the two outside drivers S2, S3 (the midranges). As frequency increases, the capacitive reactance of the capacitor C1 decreases and the inductive reactance of the inductor I1 increases. As frequency decreases, the capacitive reactance of the capacitor C1 increases and the inductive reactance of the inductor I1 decreases. Therefore, at higher frequencies, drivers S2 and S3 have a higher signal resistance, while driver S1 has a lower signal resistance. On the other hand, at lower frequencies, drivers S2 and S3 have a lower signal resistance, while driver S1 has a higher signal resistance. In this way, the circuit 500 encompasses both power tapering and frequency response tailoring between the drivers S1, S2, S3. Of course, the circuit 500 and components thereof may be selected or adjusted to optimize for dispersion, power handling and frequency response for particular speaker configurations and/or performance requirements as needed. It should also be appreciated that the SI unit values for components of the circuit 500 shown in FIG. 21 are by way of example and may change with different circuit configurations and/or components.

In the depicted system, for the midrange frequencies that require more power (~500-2000 Hz), all three drivers S1, S2, S3 are working together to handle the power to generate the required sound level. Due to the power tapering, the center driver S1 is burning less power at the lower frequencies than the outer drivers S2, S3. For the tweeter frequencies (~2-20 kHz), the power requirements can be met by the center driver S1 alone, with heat management from the heatsink sandwich to prevent overheating, and thus demagnetization and delamination. Above 2000 Hz, the single driver S1 has better on-axis frequency response and wider horizontal dispersion than multiple drivers, with improved off-axis control. The ability of the center driver S1 to meet the power handling requirements for the tweeter frequencies is also related to human perception of loudness and the spectral content of media (e.g. music). For example, less power is required at 10 kHz than 1 kHz, and the spectral content typically comprises more content at lower frequencies which thus requires more power.

Figure 22:
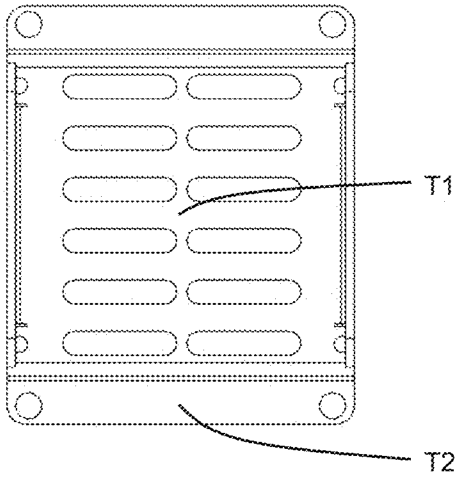
FIG. 22 shows a rear side view of the PMD structure plate indicating locations of testing thermocouples.

Thermal tests were conducted on a PMD configuration with the steel plate 200. The PMD in this example is a six-bar magnet driver, with five rear magnets and one front magnet. In this PMD, felt is arranged on the magnet surface 210, with five neodymium bar magnets then arranged spaced apart and parallel to each other on the felt on the magnet surface 210. The diaphragm was a polyimide film with laser-etched aluminum tracing. The diaphragm was tensioned over the five bar magnets via attachment to the mounting flanges 220, with a front neodymium bar magnet arranged opposite the five rear magnets. The testing was conducted based on the ANSI/CTA-426-B R-2011 ("Loudspeaker, Optimum Amplifier Power") testing standard. Temperatures were observed up to 260° F. at the center of the surface 210 on its outer side (opposite the magnets) and up to 205° F. at the center of the flanges 220 on their outer sides (opposite the diaphragm). The location of the thermocouple T1 at the center of the surface 210 and the location of the thermocouple T2 at the center of the flange 220 are shown in FIG. 22. These temperatures, which were already observed at the outer surfaces of the steel plate 200 as compared to the inner surfaces facing the magnets or diaphragm or even the magnets or diaphragm themselves, are well above the magnet demagnetization and trace delamination temperature thresholds. At these levels, the magnets were estimated to be experiencing greater than 50% demagnetization.

Figure 23:
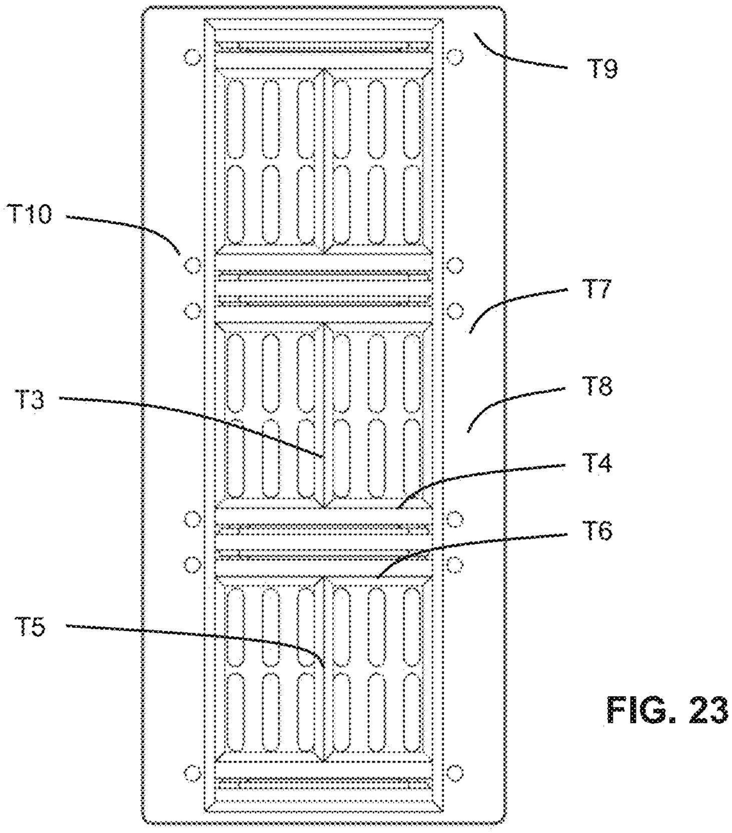
FIG. 23 shows a rear side view of the PMD mounting assembly indicating locations of testing thermocouples.

Three PMDs with the same configuration were then tested with the full panel assembly 10, including an aluminum front panel 100, individual aluminum thermal plates 300 and an aluminum peripheral thermal spreader 400, as well as the circuit 500. The testing was again conducted based on the ANSI/CTA-426-B R-2011 ("Loudspeaker, Optimum Amplifier Power") testing standard. In particular, the testing was run at 328 W, 367 W, 410 W and 462 W power levels for 30 minutes each, with 10 thermocouples arranged at various positions on the plates 200, 300 and 400. The locations of thermocouples T1 and T2 on the PMD plate 200 were the same as in FIG. 22. As shown in FIG. 23, an additional eight thermocouples T3-T8 were arranged at various locations on the rear thermal plates 300 and peripheral plate 400. At no point did any of the measured temperatures rise above 135° F., which is well below the 186° F. demagnetization point. Accordingly, this system exhibited excellent performance with respect to thermal management even at high power levels, such that the smaller PMDs can be used to increase tweeter section power handling and maximum sound pressure level, without sacrificing tweeter dispersion or frequency response, which can therefore then be matched with larger driver/woofers, such as those used in line arrays.

While a number of aspects and embodiments have been discussed above, those of skill in the art will recognize certain modifications, permutations, additions and sub-combinations therefor. It is therefore intended that the following appended claims hereinafter introduced are interpreted to include all such modifications, permutations, additions and sub-combinations, which are within their true spirit and scope. Each embodiment described has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used have their art-recognized meaning, which can be found by reference to standard texts, journal references and contexts known to those skilled in the art. Above definitions are provided to clarify their specific use in the context of the disclosure.

LIST OF REFERENCE NUMERALS

| | |
|---|---|
| 10 | assembly |
| 50 | PMD |
| 52 | diaphragm |
| 54 | trace |
| 56 | magnets |
| 58 | retainers |
| 100 | front panel |
| 102 | front side |
| 104 | back side |
| 110 | sound openings |
| 112 | support member |
| 114 | front magnet mounting recess |
| 116 | mesh structures |
| 118 | frame members |
| 120 | mounting fastener holes |
| 122 | assembly fastener holes |
| 200 | PMD structure plate |
| 210 | magnet mounting surface |
| 220 | mounting flanges |
| 222 | fastener holes |
| 300 | rear thermal plate |
| 302 | mounting flanges |
| 304 | frame |
| 306 | crossmember |
| 322 | fastener holes |
| 400 | peripheral thermal spreader plate |
| 402 | front side |
| 404 | lateral side |
| 410 | tolerance gaps |
| 420 | relief surfaces |
| 422 | fastener holes |
| 500 | frequency modulator circuit |

The invention claimed is:

1. A speaker mounting assembly comprising:

a front panel having a front side, a rear side, and at least three sound openings extending between the front side and the rear side, with support members extending across each of the openings, wherein the rear side of the front panel has interface surfaces adjacent the openings;

at least three planar magnetic drivers (PMDs) each being associated with a respective sound opening of the at least three sound openings in the front panel, each PMD comprising at least one front magnet, one or more rear magnets, a diaphragm arranged between the rear and front magnets, and a PMD structure plate having a magnet mounting surface and lateral mounting flanges, wherein the magnet mounting surface and the mounting flanges have a first side that faces in a direction of the front panel and a second side that faces away from the front panel, wherein the one or more rear magnets are arranged on the first side of the magnet mounting surface, wherein the diaphragm extends between the mounting flanges, and wherein the mounting flanges are positioned at a distance from the magnet mounting surface to accommodate the one or more rear magnets between the diaphragm and the first side of the magnet mounting surface;

at least three rear thermal plates each being associated with a respective PMD structure plate of the at least three PMDs, each rear thermal plate comprising lateral mounting flanges attached to a frame, wherein the frame and the mounting flanges have a first side that faces in the direction of the front panel and a second side that faces away from the front panel; and a thermal spreader plate designed as a frame forming an opening, the frame having a first side that faces in the direction of the front panel and a second side that faces away from the front panel, with relief surfaces formed on the first side of the frame adjacent the opening of the thermal spreader plate;

wherein the PMD structure plates are mounted to the front panel, the rear thermal plates are mounted to the PMD structure plates, and the thermal spreader plate is mounted to the rear thermal plates;

wherein the interface surfaces of the rear side of the front panel interface with the first sides of the mounting flanges of the PMD structure plates;

wherein the second sides of the magnet mounting surfaces of the PMD structure plates interface with the first sides of the frames of the rear thermal plates, and the second sides of the mounting flanges of the PMD structure plates interface with the first sides of the mounting flanges of the rear thermal plates; and wherein the second sides of the mounting flanges of the rear thermal plates interface with the relief surfaces formed on the first side of the frame of the thermal spreader plate.

2. The speaker mounting assembly of claim 1, wherein the front magnets of the PMDs are mounted to the support members of the front panel on the rear side thereof.

3. The speaker mounting assembly of claim 2, wherein the front magnets of the PMDs are attached to the support members of the front panel with adhesive.

4. The speaker mounting assembly of claim 2, wherein, on the rear side of the front panel, the support members of the front panel comprise magnet mounting recesses, and the front magnets of the PMDs are positioned in the magnet mounting recesses.

5. The speaker mounting assembly of claim 2, wherein each PMD has only one front magnet provided as a bar magnet.

6. The speaker mounting assembly of claim 1, wherein the front panel further comprises mesh structures or frame members provided in the sound openings of the front panel on either side of the support members.

7. The speaker mounting assembly of claim 1, wherein the support members of the front panel comprise solid cross-members.

8. The speaker mounting assembly of claim 1, wherein the support members of the front panel comprise mesh structures.

9. The speaker mounting assembly of claim 1, wherein the magnet mounting surfaces of the PMD structure plates each have a plurality of apertures extending therethrough.

10. The speaker mounting assembly of claim 1, wherein each PMD comprises rear magnets provided as bar magnets and aligned with ends thereof positioned in retainers.

11. The speaker mounting assembly of claim 10, wherein the rear magnets are attached to the retainers and/or the magnet mounting surfaces of the PMDs with adhesive.

12. The speaker mounting assembly of claim 10, wherein each PMD has five rear magnets.

13. The speaker mounting assembly of claim 1, wherein the front and rear magnets of the PMDs are neodymium magnets.

14. The speaker mounting assembly of claim 1, wherein the frame of each rear thermal plate has at least one crossmember extending across an opening formed by peripheral members of the frame, and the crossmember interfaces with the second side of the magnet mounting surface of the PMD structure plate.

15. The speaker mounting assembly of claim 1, wherein tolerance gaps remain between the front panel and the thermal spreader plate.

16. The speaker mounting assembly of claim 1, wherein the front panel, the PMD structure plates, the rear thermal plates, and the thermal spreader plate are coupled via fasteners inserted into fastener holes, and wherein the fastener holes extend through the thermal spreader plate, the mounting flanges of the rear thermal plates, and the mounting flanges of the PMD structure plates and extend into the front panel.

17. The speaker mounting assembly of claim 1, wherein the speaker mounting assembly has three PMDs, the front panel has three sound openings, and one of the three sound openings is a central sound opening positioned between two outer sound openings, with the PMD associated with the central sound opening being a center PMD, and the PMDs associated with the outer sound openings being outer PMDs, the speaker mounting assembly further comprising:

a circuit comprising a first path and a second path connected in parallel to the first path, wherein the first path includes a capacitor and a resistor which are connected in parallel to one another and connected in series to the center PMD, and wherein the second path includes an inductor connected in series to one or both of the outer PMDs.

18. The speaker mounting assembly of claim 17, wherein the inductor is a first inductor and the second path has one of the two outer PMDs connected in series to the first inductor, wherein the circuit comprises a third path connected in parallel to the first and second paths, and wherein the third path includes a second inductor connected in series to another of the two outer PMDs.

19. The speaker mounting assembly of claim 17, wherein the three PMDs are identical in design.

20. The speaker mounting assembly of claim 17, wherein the three PMDs have a frequency range of at least 500-20000 Hz.

21. The speaker mounting assembly of claim 20, wherein the outer PMDs have a higher signal resistance than the center PMD at tweeter frequencies above 2000 Hz.

22. The speaker mounting assembly of claim 20, wherein the center PMD alone produces sound at the tweeter frequencies above 2000 Hz.

23. The speaker mounting assembly of claim 20, wherein all three PMDs produce sound at midrange frequencies between 500-2000 Hz, and the center PMD handles less power than the outer PMDs at the midrange frequencies.

* * * * *